United States Patent
Lu et al.

(10) Patent No.: US 7,108,804 B2
(45) Date of Patent: Sep. 19, 2006

(54) SUPPORTED NICKEL CATALYST FOR SYNTHESIS GAS PREPARATION

(75) Inventors: Yong Lu, Auburn, AL (US); Luwei Chen, Singapore (SG); Jianyi Lin, Singapore (SG); Frits M. Dautzenberg, Mahwah, NJ (US)

(73) Assignees: National University of Singapore, Singapore (SG); ABB Lummus Global Inc., Bloomfield, NJ (US)

( * ) Notice: Subject to any disclaimer, the term of this patent is extended or adjusted under 35 U.S.C. 154(b) by 264 days.

(21) Appl. No.: 10/461,254

(22) Filed: Jun. 12, 2003

(65) Prior Publication Data

US 2004/0054016 A1     Mar. 18, 2004

Related U.S. Application Data

(60) Provisional application No. 60/387,599, filed on Jun. 12, 2002.

(51) Int. Cl.
    *C01B 3/40*     (2006.01)
    *B01J 21/02*    (2006.01)
    *B01J 27/185*   (2006.01)

(52) U.S. Cl. ............... 252/373; 502/207; 502/213; 502/302; 502/303; 502/304

(58) Field of Classification Search ............... 502/213, 502/207, 302, 303, 304, 337; 252/373
    See application file for complete search history.

(56) References Cited

U.S. PATENT DOCUMENTS

| | | | | |
|---|---|---|---|---|
| 4,140,493 A | * | 2/1979 | Johnson et al. | 48/214 A |
| 4,518,523 A | * | 5/1985 | Blum et al. | 502/209 |
| 4,629,717 A | * | 12/1986 | Chao | 502/208 |
| 4,632,915 A | * | 12/1986 | Keppel et al. | 502/209 |
| 4,670,415 A | * | 6/1987 | Keppel et al. | 502/209 |
| 4,749,671 A | * | 6/1988 | Saito et al. | 502/64 |
| 5,817,593 A | * | 10/1998 | Chang et al. | 502/207 |
| 6,037,300 A | * | 3/2000 | Kasztelan et al. | 502/204 |
| 6,402,989 B1 | * | 6/2002 | Gaffney | 252/373 |
| 6,544,439 B1 | | 4/2003 | Lewis et al. | 252/373 |
| 6,911,161 B1 | * | 6/2005 | Xu et al. | 252/373 |

FOREIGN PATENT DOCUMENTS

JP     61-42589     *  3/1986     ................. 502/206

OTHER PUBLICATIONS

Jia, Meilin et al., "*An integrated air-POM syngas/dimethyl ether process from natural gas*", Applied Catalysis A: General 233, Jan. 17, 2002, pp. 7-12.

Olsbye, Unni et al., "*An investigation of the coking properties of fixed and fluid bed reactors during methane-to-synthesis gas reactions*" Applied Catalysis A: General 228, Mar. 28, 2002, pp. 289-303.

(Continued)

*Primary Examiner*—Wayne A. Langel
(74) *Attorney, Agent, or Firm*—Klarquist Sparkman, LLP

(57) ABSTRACT

In one aspect, the invention provides a catalyst for the production of synthesis gas, the catalyst comprising a) from about 0.1 to about 1.3% by weight of nickel that is supported on modified support, and b) a promoting agent. The catalyst can also comprise a dispersing agent. In another aspect, the invention provides a process for preparing the catalyst above, and a process for the catalytic partial oxidation of methane using the same catalyst.

28 Claims, 7 Drawing Sheets

OTHER PUBLICATIONS

Choudhary, V.R. et al., "*Low temperature oxidative conversion of methane to syngas over NiO-CaO catalyst*" Catalysis Letters 15, vol. 4, (1992), pp. 363-370, no month.

Choudhary, V.R. et al., "*Selective oxidation of methane to CO and $H_2$ over unreduced NiO-rare earth oxide catalysts*" Catalysis Letters 22, vol. 4, (1992), pp. 289-297, no month.

* cited by examiner

SUPPORTED NICKEL CATALYST FOR SYNTHESIS GAS PREPARATION

CROSS-REFERENCE TO CORRESPONDING APPLICATIONS

This application claims the benefit of U.S. Provisional Patent Application Ser. No. 60/387,599, filed Jun. 12, 2002, entitled "Supported Nickel Catalyst for Preparing Synthesis Gas via Catalytic Partial Oxidation of Light Paraffin and the Preparation Method Thereof", the contents of which are hereby incorporated by reference.

FIELD OF THE INVENTION

This invention relates to the production of synthesis gas. More specifically, this invention relates to a supported nickel catalyst suitable for the production of synthesis gas.

BACKGROUND OF THE INVENTION

Synthesis gas, a mixture of carbon monoxide (CO) and molecular hydrogen ($H_2$), is a valuable industrial feedstock for the manufacture of a variety of chemicals, for example methanol and acetic acid. Synthesis gas (also referred to as syngas) can also be used to prepare higher molecular weight alcohols or aldehydes as well as higher molecular weight hydrocarbons.

Perhaps the most common commercial source of synthesis gas is the steam reforming of coal or of hydrocarbons, such as natural gas. In the steam reforming process, a mixture of water and hydrocarbon is contacted at a high temperature, for example in the range from about 850° C. to about 900° C., and typically in the presence of a catalyst to form a mixture of hydrogen and carbon monoxide. Using methane as the hydrocarbon, the theoretical stoichiometry for the steam reforming reaction is as follows:

$$CH_4 + H_2O \rightarrow 3H_2 + CO$$

The steam reforming reaction is a highly endothermic reaction, and, as discussed above, it produces a relatively high molar ratio of hydrogen to carbon monoxide.

Other methods, which are more attractive than the steam reforming reaction, are available for preparing synthesis gas. One such method is the reaction of a hydrocarbyl compound such as methane with carbon dioxide. This reaction proceeds according to the following equation:

$$CH_4 + CO_2 \rightarrow 2H_2 + 2CO$$

This reaction, like the steam reforming reaction, is strongly endothermic and occurs at fairly lengthy contact times of approximately 1 second or more. This reaction does, however, produce a low ratio of hydrogen to carbon monoxide (1:1) and it is very useful where there is an abundant supply of carbon dioxide, for example, at a refinery or near naturally-occurring $CO_2$ reserves. Additionally, the reforming reaction using carbon dioxide can be used in conjunction with the steam reforming reaction to adjust the ratio of hydrogen to carbon monoxide.

Alternatively, synthesis gas can also be produced by the partial oxidation of a hydrocarbon, for example methane, producing synthesis gas having a lower ratio of hydrogen to carbon monoxide (2:1), according to the following equation:

$$CH_4 + 1/2 O_2 \rightarrow 2H_2 + CO$$

Catalytic partial oxidation of methane can occur at shorter contact times ($10^{-3}$ s or less) and it can produce synthesis gas more selectively and efficiently. Unlike the steam/$CO_2$ reforming reactions, catalytic partial oxidation of methane is mildly exothermic and does not require a large energy input. Due to these characteristics, the preparation of synthesis gas via catalytic partial oxidation of methane can greatly reduce the required capital investment.

In all of the processes described above for preparing synthesis gas, it is advantageous for the reaction to be carried out in the presence of a catalyst. Catalysts for the steam reforming of methane and of other hydrocarbons are commonly based on nickel as the active catalyst component.

Vernon et al. [Catalysis Letters, 1990, 6:181–186] disclosed that methane can be converted to synthesis gas over catalysts such as palladium, platinum, ruthenium on alumina, nickel on alumina, and certain transition metal oxides including $Pr_2Ru_2O_7$ and $Eu_2Ir_2O_7$. Vernon et al. disclosed that nickel-on-alumina catalysts are effective for the conversion of methane to synthesis gas using molecular oxygen. However, such a catalyst, as well as commercial nickel-containing steam reforming and steam cracking catalysts, form coke as a by-product in amounts that lead to a relatively rapid deactivation of the catalyst. Although the other catalysts described in Vernon's paper, such as ruthenium on alumina, can be used to convert methane in the presence of molecular oxygen, such transition metals are expensive.

Choudhary et al. [Catalysis Letters, 1993, 22(4):289–297; Catalysis Letters, 1992, 15(4):363–370] disclosed that alkaline and rare earth oxide supported nickel catalysts (Ni loading greater than 10 wt %) were capable of providing a 91% $CH_4$ conversion, a 95% $H_2$ selectivity and a $H_2$:CO ratio of 2:1 in a synthesis gas product, using a pure methane: pure oxygen molar ratio of 1.8:1 at a contact time of 4.8 ms. Choudhary et al. also disclosed [Catalysis Letters, 1995, 32(3,4):387–390; Journal of Catalysis, 1997, 172:281–297] that supported nickel catalysts prepared by using commercially sintered, low-surface area porous catalyst carriers (e.g. $SiO_2$ and/or $Al_2O_3$) precoated with MgO, CaO or rare-earth oxide show higher activity, selectivity and productivity in methane-to-syngas conversion reactions, than the catalysts prepared using catalyst carriers without any precoating.

Lu et al. [Journal of Catalysis, 1998, 177:386–388] disclosed a $CaAl_2O_4$-modified-$Al_2O_3$ supported nickel catalyst with a Ni-loading of 2.9% by weight used for partial oxidation of methane. Such a catalyst offers approximately 80% $CH_4$ conversion and approximately 93% $H_2$ and approximately 90% CO selectivity during 100-hour running at 600° C. and a contact time of 4 ms.

U.S. Pat. No. 3,791,993 to Rostrup-Nielsen discloses the preparation of catalysts containing nickel for reforming gaseous or vaporizable liquid hydrocarbons using steam, carbon oxide, oxygen and/or air. The catalysts disclosed therein are prepared by co-precipitating a nickel salt, a magnesium salt and an aluminate to form a sludge, washing the sludge until it is substantially free of sodium and potassium, drying, and then dehydrating at 300–750° C. The catalyst in its final form is obtained after a calcination step at 850–1100° C. The examples in U.S. Pat. No. 3,791,993 show that compositions having a 1:1:2 or a 2:7:1 mole ratio of nickel, magnesium and aluminum, respectively, are suitable for converting naphtha to hydrogen-rich gaseous products using steam reforming.

U.S. Pat. No. 6,271,170 to Suh discloses the preparation of catalysts containing nickel and alumina aerogel which are used for the carbon dioxide reforming of methane to prepare synthesis gas. The catalysts disclosed therein are prepared by a sol-gel method and supercritical drying, followed by an initial thermal treatment in an inert atmosphere at 200–500° C. and a secondary thermal treatment at a temperature higher than 500° C. in air or oxygen.

U.S. Pat. No. 6,242,380 to Park discloses the process for preparing a supported nickel catalyst for reforming hydrocarbons using steam, carbon dioxide, and oxygen. The catalyst disclosed therein is prepared by mixing a nickel salt, an alkali metal salt and/or alkaline earth metal salt with a silicon and/or aluminum-containing support, such as a zeolite, silica or alumina, decomposing the metal salts while melting all the salts, and calcining the decomposed metals at 300–1200° C. The examples in U.S. Pat. No. 6,242,380 show that a pentasil-type ZSM-5 (molar ratio of silicon/aluminum is greater than 500) supported K—Ni—Ca catalyst with a 0.08:1:3.2 mole ratio of potassium, nickel and calcium respectively, is suitable for converting $CH_4$ to synthesis gas via $CO_2$ reforming.

U.S. Pat. No. 5,653,774 to Bhattacharyya discloses the preparation of a nickel containing catalyst for preparing synthesis gas by reacting a hydrocarbyl feed material with a source of oxygen. The catalysts disclosed therein are prepared by thermally activating a nickel-containing catalyst precursor compound having a structure that is referred to as "hydrotalcite-like" at 700° C. or higher. The examples in U.S. Pat. No. 5,653,774 show that the catalysts derived from $NiMg_5Al_2(OH)_{16}CO_3$, $NiMg_3Al_2(OH)_{12}CO_3$, $Ni_2Mg_2Al_2(OH)_{12}CO_3$, $Ni_2Al_4(OH)_{12}CO_3$, $Ni_6Al_2(OH)_{16}CO_3$, $Ni_8Al_2(OH)_{20}CO_3$, $Cu_2Ni_2Al_2(OH)_{12}CO_3$, or NiAl double hydroxide, are suitable for preparing synthesis gas via partial oxidation of methane.

U.S. Pat. No. 4,877,550 to Goetsch discloses the preparation of synthesis gas from light hydrocarbons, e.g. methane, at elevated temperatures and pressures in the presence of a particulate catalyst, e.g. $Ni/Al_2O_3$. The example in U.S. Pat. No. 4,877,550 is demonstrated in a fluid bed reactor containing a $Ni/Al_2O_3$ catalyst operating at 982° C. and 25 atm, using a mixture of $CH_4:H_2O:O_2$ with a mole ratio of 1.0:0.5:0.5 as feed gas. The synthesis gas leaving the reactor is essentially at equilibrium.

In view of the great commercial interest in preparing synthesis gas by partially oxidizing readily available hydrocarbon feedstocks such as natural gas, and because of the benefits of conducting the partial oxidation of natural gas in the presence of a catalyst that remains active for an extended period of use, there is a continuing need for new, less expensive, low metal loading, durable, coke resistant, more active and selective catalysts for the production of synthesis gas.

SUMMARY OF THE INVENTION

According to one aspect of the invention, there is provided a catalyst for the production of synthesis gas, the catalyst comprising a modified support, from about 0.1 to about 1.3% by weight of nickel, and a promoting agent. The catalyst can also comprise a dispersing agent.

According to another aspect of the invention, there is provided a process for preparing a catalyst comprising nickel, a modified support, and a promoting agent, which process comprises
  a) calcining a mixture comprising a modified support and an amount of a nickel containing salt, the amount of the nickel containing salt being such that the nickel is present in the catalyst in an amount of from about 0.1 to about 1.3% by weight after calcination, and
  b) contacting the calcined mixture with the promoting agent.

According to still another aspect of the invention, there is provided a process for the catalytic partial oxidation of a hydrocarbon, the process comprising contacting a catalyst with a gaseous mixture of oxygen and a C1–C7 hydrocarbon, at a temperature of from about 500° C. to about 1200° C., the catalyst comprising a modified support and from about 0.1 to about 1.3% by weight of nickel.

BRIEF DESCRIPTION OF THE DRAWINGS

Specific embodiments of the invention will be described further with regard to the accompanying drawings.

DETAILED DESCRIPTION OF THE INVENTION

Description of the Catalyst

Figure 1:
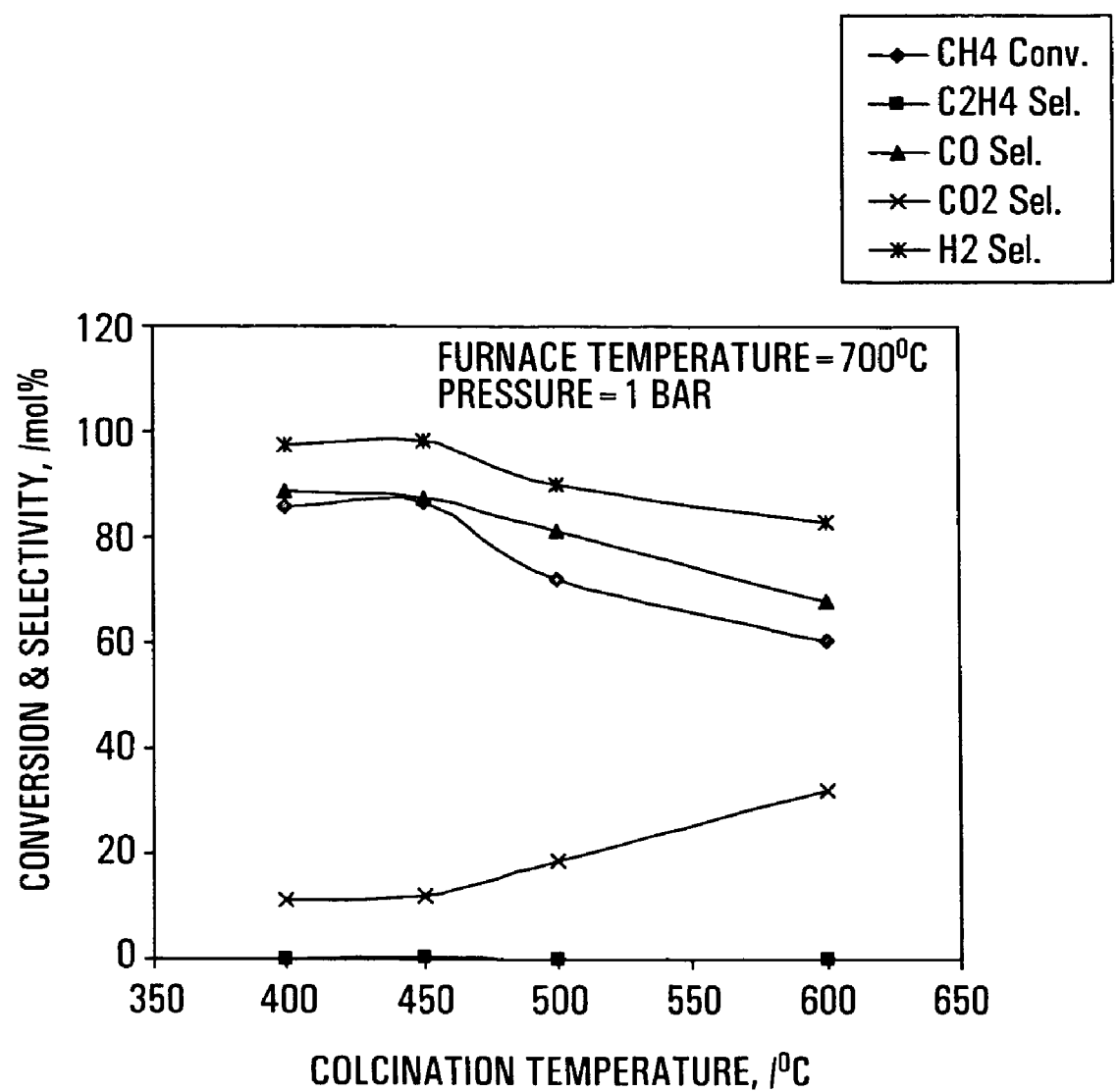
FIG. 1 graphs the activity/selectivity behaviour of the catalyst for the catalytic partial oxidation of methane in relation to the calcination temperature of the catalyst.

The invention discloses a catalyst that displays a high activity/selectivity behavior for the preparation of synthesis gas, thus giving good conversion of a hydrocarbon into $H_2$ and CO while keeping coke production low. The existing nickel catalysts can achieve high activity when the nickel concentrations are elevated, but this in turn leads to an elevated production of coke by-products. The nickel catalyst of the invention also offers advantages over non-nickel catalysts, as the metals which form the non-nickel catalysts are usually more expensive, and they do not lead to activities that are significantly higher than those observed with the catalysts of the invention.

The catalyst of the present invention can be used to produce synthesis gas from gaseous or vaporisable hydrocarbons having from 1 to 7 carbon atoms. Preferably, methane ($CH_4$) is used as a hydrocarbon in the present invention.

The catalyst of the invention is suitable for use in various synthesis gas producing reactions, such as catalytic partial oxidation, steam reforming and $CO_2$ reforming, or a combination of the above reactions.

The catalyst of the invention is comprised of nickel, which is supported on a modified support (also referred to as a "decorated" support). Nickel is present in an amount greater than 0.1% by weight of catalyst, preferably from about 0.1 to about 1.3 wt %, more preferably from 0.5 to 1 wt %, and most preferably nickel is present in an amount of about 1 wt %.

Various materials can be utilised as supports for the catalyst. Examples of suitable supports include aluminum oxides, such as $Al(OH)_3$, Boehmite (AlO(OH)), pseudo-Boehmite $(AlO(OH).xH_2O)$, and $\gamma$-$Al_2O_3$, zirconium oxides such as $ZrO_2$, titanium oxides such as $TiO_2$, magnesium oxides such as MgO, silicon oxides such as $SiO_2$, or mixtures thereof. Preferably, the support is an aluminum oxide. While the following description will only discuss the use of aluminum oxides as a support, the other supports given above can also be used interchangeably in the present invention.

The support of the catalyst is preferably modified by one or more elements selected from the periodic table groups 1 to 12, 14, 15 and rare earth elements (as identified under the new IUPAC periodic table notation). The modifying elements, which are also referred to as "decoration" elements, are usually in their ionic state and they normally form a thin layer of spinel or spinel-like structure on the surface of the support. In a preferred embodiment, the modifying element is selected from magnesium, calcium, barium, titanium, zirconium, vanadium, cobalt, copper, zinc, silicon and phosphorus. Without wishing to be bound by theory, it is believed that the decoration of the support prevents the formation of less-active particles, such as $NiAl_2O_4$, and that it stabilises the nickel particles. Preferably, the modifying element is present in a ratio of from about 2% to about 14% by weight of total catalyst.

In one embodiment, the catalyst further comprises one or more promoting agents. Preferably, the promoting agent is present in the catalyst in quantities of 0.5% or less by weight. A promoting agent can be selected from periodic table groups 1 to 15, and preferred promoting agents comprise boron or phosphorus. The promoting agent forms an alloy with the nickel comprised in the catalyst or it forms an oxide and, without wishing to be bound by theory, it is believed that the presence of the promoting agent decreases the nickel particle size and prevents sintering or oxidation of the nickel.

The catalyst can also comprise a dispersing agent, which comprises a rare earth element. Preferably, the rare earth element is selected from the group consisting of La, Sm and Ce. While not wanting to be bound by theory, it is believed that the rare earth element improves the dispersion of nickel on the support, thus decreasing the size of the nickel particles and increasing their stability. In.a preferred embodiment, the dispersing element is present in the catalyst in quantities of 0.03% or less by weight.

The smaller size of the nickel particles, which is achieved due to the lower amount of nickel in the catalyst and the use of a modified support, leads to a catalyst that has a higher coke resistance. This higher coke resistance is an important advantage that translates into a catalyst that has a longer lifetime, and a catalyst that can be utilised in more flexible operation conditions, such as higher pressures and temperatures. The smaller size of the nickel particles in the catalyst can also be enhanced by the presence of a promoting agent and of a dispersing agent.

Examples of catalysts in accordance with the invention include calcium-modified $Al_2O_3$ with about 1% Ni, magnesium-modified $Al_2O_3$ with about 1% Ni, barium-modified $Al_2O_3$ with about 1% Ni, zinc-modified $Al_2O_3$ with about 1% Ni, zirconium-modified $Al_2O_3$ with about 1% Ni, copper-modified $Al_2O_3$ with about 1% Ni, cobalt-modified $Al_2O_3$ with about 1% Ni, vanadium-modified $Al_2O_3$ with about 1% Ni, phosphorus-modified $Al_2O_3$ with about 1% Ni, calcium-modified $Al_2O_3$ with about 1% Ni and a boron promoting agent, calcium-modified $Al_2O_3$ with about 1% Ni and both a boron promoting agent and a lanthanum dispersing agent, and calcium-modified $Al_2O_3$ with about 1% Ni and both a boron promoting agent and a cerium dispersing agent. More preferably, the catalyst is comprised of from 0.5% to 1% by weight of nickel, from 0.1% to 0.5% by weight of boron as promoting agent, from 4% to 8% by weight of calcium as a support modifier and from 0.1% to 0.05% by weight of lanthanum as a dispersing agent.

Preparation of the Catalyst

The invention also discloses a process for preparing the catalyst described above. The process comprises the calcination of a mixture of a modified support, for example $Al_2O_3$, and an amount of a nickel containing salt, the amount of the nickel containing salt being such that the nickel is present in the catalyst in an amount of from about 0.1% to about 1.3% by weight after calcination. By calcination is meant the process of heating the mixture at high temperature, preferably under an air atmosphere. Optionally, the nickel/support mixture can be dried before the calcination is carried out.

Figure 4:
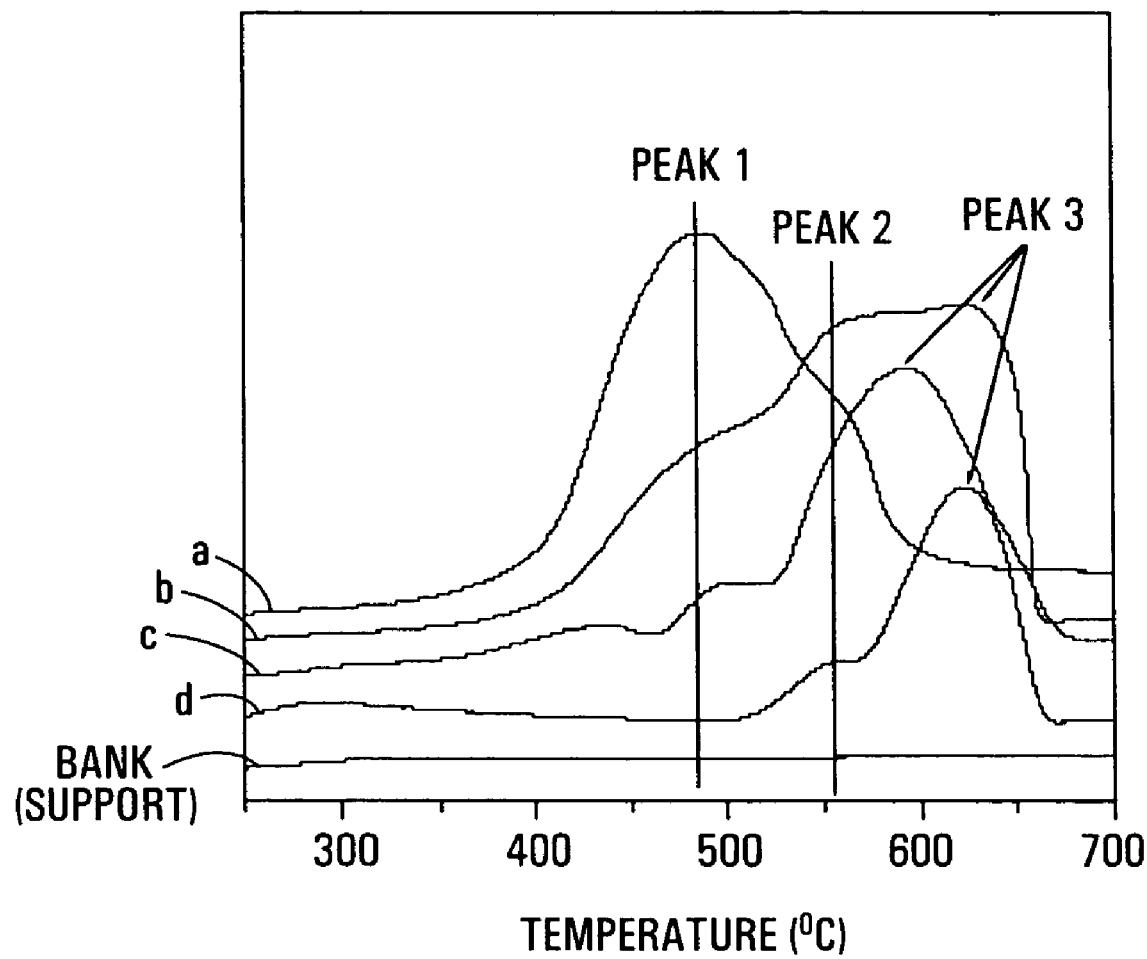
FIG. 4 displays the Temperature Programmed Reduction (TPR) profiles for 1 wt % $Ni/CaAl_2O_4$—$Al_2O_3$ catalysts pre-calcined for 5 h at (a) 400° C., (b) 450° C., (c) 500° C., and (d) 600° C.

In a preferred embodiment, the mixture of nickel and modified support is calcined at a temperature of from about 300° C. to about 650° C. More preferably, the calcination temperature is from about 350° C. to about 500° C. Such calcination temperatures are lower than those normally used when preparing synthesis gas catalysts, and the calcination at such low temperatures is one of the factors that permit lowering the nickel content of the catalyst without incurring loss of activity or selectivity. Increases in calcination temperature leads to stronger interactions between the nickel and the support, giving nickel compounds that are more difficult to reduce. This is illustrated in FIG. 4, which shows the Temperature Programmed Reduction (TPR) profile of nickel compounds prepared at different temperatures. It is clear from FIG. 4 that a higher calcination temperature leads to less reducible compounds. It has been put forth that reduced nickel moieties are involved in synthesis gas catalysis, and under such a hypothesis the observations from FIG. 4 are confirmed by FIG. 1, where the activity of the catalyst decreases as the calcination temperature increases from 400° C. to 600° C.

Preferably, the nickel containing salt used in the preparation of the catalyst is selected from the group consisting of nickel nitrate $(Ni(NO_3)_2.6H_2O)$, nickel chloride $(NiCl_2.6H_2O)$, $NiCO_3$, $Ni(C_2H_3O_2)_2.xH_2O$, $NiSO_4.6H_2O$, nickel citrate and nickel phosphate.

In one embodiment, one or more dispersing agents, comprising rare earth elements, are added to the nickel/support mixture before it is calcined. Examples of rare earth elements found in the dispersing agents include La, Sm and Ce. The dispersing agents are usually in the form of nitrate, chloride or acetate salts of the rare earth elements, the nitrate salt being preferred. Particularly preferred examples of dispersing agents include $La(NO_3)_3.9H_2O$ and $Ce(NO_3)_3.9H_2O$. The content of rare earth metal in the catalyst is preferably about 0.03% by weight or less, after calcination.

Once the calcination of the nickel catalyst and, optionally, of the dispersing agent is complete, the compound formed can, in one embodiment, be reduced with a promoting agent, which preferably contains boron or phosphorus. Examples of suitable promoting agents that comprise boron or phosphorus include borohydride $(BH_4^-)$ and hypophosphite ($H_2PO_2^-$) salts. The boron or phosphorus promoting agents are preferably added as a solution, which addition is preferably carried out at room temperature. Once the reaction between the catalyst and the boron or phosphorus promoting agent is complete, the resulting mixture can be washed thoroughly with, for example, distilled water and ethanol. The content of boron or phosphorus from the promoting agent in the catalyst is preferably 0.5% by weight or less, relative to the final weight of the catalyst when dried.

The modifying agent and the promoting agent are differentiated by their interaction with the catalyst, and by the way they are introduced during the preparation of the catalyst. The modifying element is intimately associated with the catalyst support, and it is combined with the support prior to the introduction of nickel. The promoting agent forms an alloy with the nickel or an oxide, and it is only added to the catalyst once the nickel is supported on the modified support.

Preparation of the Modified Support

Modified supports suitable for use in the present invention have been described in greater detail earlier. Such modified supports can be prepared by mixing a metal oxide with a compound that comprise a modifying element selected from periodic table groups 1 to 12, 14, 15 and rare earth elements, said compound being in the form of a salt or an acid solution, and by calcining the resulting mixture. The mixture of the metal oxide and the compound containing the modifying element can optionally be dried before the calcination step is carried out.

The calcination step is carried out at a temperature of from about 500° C. to about 850° C. for up to 10 hours. Preferably, the mixture is calcined at a temperature of from about 700° C. to about 850° C.

Examples of suitable metal oxides for use as support include aluminum oxides, zirconium oxides, titanium oxides, magnesium oxides and silicon oxides, of which aluminum oxides are preferred. Aluminum oxides include $\gamma$-$Al_2O_3$, AlO(OH), $Al(OH)_3$ and (AlO(OH).$xH_2O$). Pseudo-boehmite (AlO(OH).$xH_2O$) is an aluminum oxide-hydride that contains some crystalline water, which water can be eliminated when the pseudo-boehmite is heated to about 280° C. or more. Boehmite and pseudo-boehmite can be transformed into $Al_2O_3$ through heating at higher temperatures, for example from about 500° C. to about 650° C. The most preferred aluminum oxide for use in the present invention is $\gamma$-$Al_2O_3$, which is commercially available from Alfa Aesar (Alfa Chemicals Limited) with a surface area of 190 $m^2$/g.

Compounds that comprise modifying elements and that are suitable for preparing modified supports include sodium silica (soluble glass) and silica sol-gel (Group 14), soluble phosphates, such as phosphoric acid (Group 15), soluble salts where the desired element is in the form of an acid radical (Groups 5, 6, 7), titanium and zirconium salts such as titanium sulfate oxide and zirconium dinitrate (or dichloride) oxide (Group 4), and nitrate, chloride or acetate metal salts of Group 1, 2, 8 to 12, and rare earth metals, particularly the nitrate salts of these metals.

Use of the Catalyst for Preparing Synthesis Gas

The catalyst according to the invention can be used with any synthesis gas forming reactions, such as catalytic partial oxidation, steam reforming, $CO_2$ reforming, or a combination of the above reactions. In all of these processes, the catalyst can be subjected to a wide range of pressures, for example from 1 atm to 100 atm.

In one embodiment, the invention provides a process for the catalytic partial oxidation of a hydrocarbon such as methane. The process comprises contacting the catalyst with a gaseous mixture of oxygen and methane, preferably at temperatures of 500° C. to 1200° C., said mixture having a preferred ratio of oxygen to methane of approximately 1:2. The catalyst can be contacted with the gaseous mixture at temperatures of about 550° C., and more preferably the catalyst is contacted with the gaseous mixture at a temperature of about 750° C.

Prior to contacting the catalyst with the gaseous mixture of oxygen and methane, the catalyst of the invention is preferably contacted with a reductive gas, for example hydrogen, optionally at elevated temperatures such as from 500° C. to 1000° C. More preferably, the catalyst is contacted with hydrogen at temperatures of from 500° C. to 850° C. and most preferably, the catalyst is contacted with hydrogen at a temperature of 550° C. This contact with a reductive gas is believed to reduce nickel to a more active oxidation state.

Catalytic partial oxidation of hydrocarbons is often carried out in stainless steel tube reactors. It was found that the walls of standard stainless steel tube reactors display a significant catalytic activity for the catalytic partial oxidation reaction, especially at higher pressure and higher temperatures. In a comparative test using a standard reactor without catalyst, approximately 20% of $CH_4$ conversion was reached at 700° C. and 7 bar pressure, accompanied with the production of important coke by-products.

Figure 5:
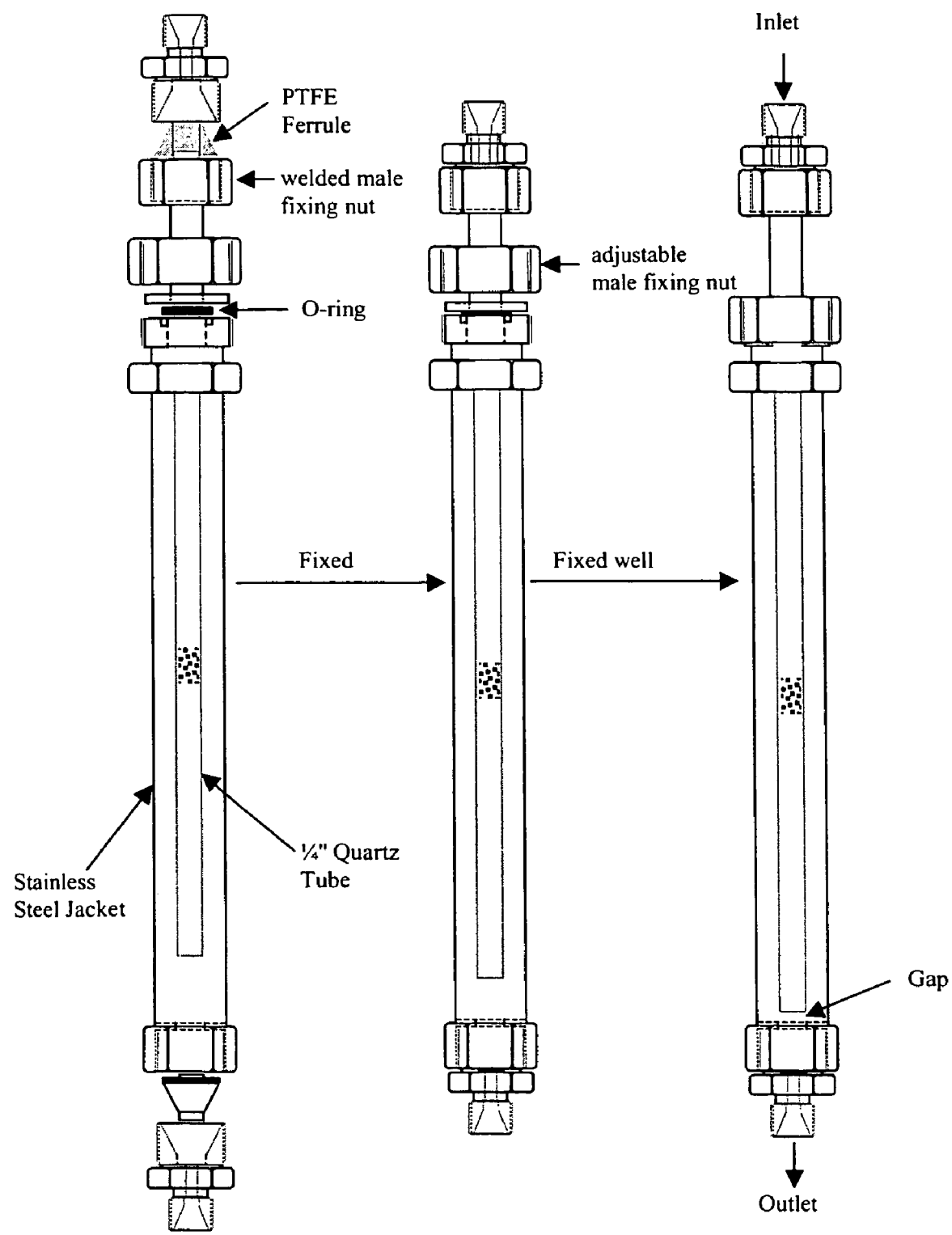
FIG. 5 displays the structural diagram of the quartz tube fixed-bed reactor with a stainless steel jacket.

In order to define the catalytic abilities of the compounds of the invention, it was necessary to design a reactor system not prone to catalyzing the partial oxidation reaction. A high-pressure quartz tube (internal dimensions of approximately 0.25 inch) micro-reactor with stainless steel tube jacket was designed and produced successfully. Quartz was selected as it is inert and it displays no substantial catalytic activity in the production of synthesis gas. The structural diagram of the tube reactor is illustrated in FIG. 5. The quartz tube can be sealed by using a PTFE ferrule and it can be fixed together with the stainless steel adapter and the male connector, and then this part can be fixed with the stainless steel tube jacket by the adjustable female fixing nut where an O-ring is used for sealing. There is a gap between the end of the quartz tube and the steel tube jacket. This ensures that the pressure at both the internal and the external sides of the quartz tube can balanced quickly so that the tube reactor can work at higher pressure without causing damage to the quartz tube. It should be stressed that the gas filling the space between quartz wall and steel wall is in static equilibrium when the pressure at both internal and external sides of the quartz tube are balanced, which means that the catalytic effect of the steel wall can be substantially eliminated as the gas flow passes through the catalyst bed without touching the steel wall. Such a system, without the presence of catalyst, can produce a $CH_4$ conversion of no more than 5% at a temperature of 700° C. and a pressure of 7 bars. The activity results reported in the following examples, tables and figures were obtained using the micro-reactor described above.

Use of the catalyst of the invention to produce synthesis gas through a $CO_2$ reforming process and a coupled steam reforming and catalytic partial oxidation process is shown in Examples 28 and 29 below.

EXAMPLES

The following examples are offered by way of illustration and not by way of limitation.

Example 1

In this example, a Ca-modified-$Al_2O_3$ support and a supported nickel catalyst with nickel content of 1.0% by weight were prepared using incipient wetness impregnation method. Details on this method are found in: Catalyst Manufacture, Laboratory and Commercial Preparations, by Alvin B. Stiles, MARCEL DEKKER, INC. New York, the relevant parts of which are hereby incorporated by reference.

4.12 g of calcium nitrate ($Ca(NO_3)_2.4H_2O$) was dissolved in 9.0 ml of distilled water to give an aqueous solution containing 0.7 g of calcium. 10.0 g of $\gamma$-$Al_2O_3$ (SA:190 m$^2$/g; Particle size: ~100 μm) was added to this aqueous solution with calcium content of 0.7 g, and the solution was dried by suction until the support had a substantially dry appearance. Subsequently, the water was evaporated and the mixture was dried at 100° C. using an electric heater. Calcination was then carried out by heating the mixture to 800° C. in an electric furnace for 5 hours to give a calcium-modified $Al_2O_3$ support. The support product is referred to as Ca-modified-$Al_2O_3$.

In order to couple the nickel with the prepared modified-$Al_2O_3$, 10 g of the Ca-modified-$Al_2O_3$ was added into an aqueous solution containing 0.495 g of nickel nitrate (Ni($NO_3$)$_2$.6H$_2$O) in 8.5 ml of distilled water. The product was subsequently dried at 100° C. and calcined for 5 hours at 450° C. to form nickel catalyst having a nickel content of 1.0% by weight. The catalyst product is referred to as 1% Ni/Ca-modified-$Al_2O_3$.

Examples 2 to 4

In these examples, Mg-, Ba-, and Zn-modified $Al_2O_3$ supports and supported nickel catalyst with nickel content of 1.0% by weight were prepared.

The modified-$Al_2O_3$ supports having the same metal content (weight percentage) as Example 1 were prepared by the method described in Example 1, using magnesium nitrate as a magnesium precursor, barium nitrate as a barium precursor and zinc nitrate as a zinc precursor, respectively, and $\gamma$-$Al_2O_3$ as used in Example 1. These supports are referred to as Mg-modified-$Al_2O_3$, Ba-modified-$Al_2O_3$, and Zn-modified-$Al_2O_3$, respectively.

Mg-modified-$Al_2O_3$, Ba-modified-$Al_2O_3$, and Zn-modified-$Al_2O_3$ supported nickel catalysts having the same nickel content as Example 1 were prepared by the method described in Example 1. The catalyst products are referred to as 1% Ni/Mg-modified-$Al_2O_3$, 1% Ni/Ba-modified-$Al_2O_3$, and 1% Ni/Zn-modified-$Al_2O_3$, respectively.

Example 5

In these examples, a Zr-modified $Al_2O_3$ support and a supported nickel catalyst having a nickel content of 1.0% by weight were prepared.

A Zr-modified $Al_2O_3$ support having the same metal content as Example 1 was prepared by the same method described in Example 1 by using zirconium dinitrate oxide as a zirconium precursor, and $\gamma$-$Al_2O_3$ as used in Example 1. This support is referred to as Zr-modified-$Al_2O_3$.

Zr-modified-$Al_2O_3$ supported nickel catalysts having the same nickel content as Example 1 was prepared by the same method described in Example 1. The catalyst product is referred to as 1% Ni/Zr-modified-$Al_2O_3$.

Examples 6 to 7

In these examples, Cu- or Co-modified $Al_2O_3$ supports and supported nickel catalysts with nickel content of 1.0% by weight were prepared.

Cu- or Co-modified $Al_2O_3$ supports were prepared by the same method described in Example 1 by using copper nitrate as a copper precursor and cobalt nitrate as a cobalt precursor, respectively, and the same amount of $\gamma$-$Al_2O_3$ as used in Example 1. In contrast with Example 1, 9.0 ml of solution of the metal nitrates with metal content of 0.5 g was used to impregnate the $\gamma$-$Al_2O_3$. The supports are referred to as Cu-modified-$Al_2O_3$ and Co-modified-$Al_2O_3$, respectively. Cu-modified-$Al_2O_3$, and Co-modified-$Al_2O_3$ supported nickel catalysts having the same nickel content as Example 1 were prepared by the same method described in Example 1. The catalyst products are referred to as 1% Ni/Cu-modified-$Al_2O_3$, and 1% Ni/Co-modified-$Al_2O_3$, respectively.

Example 8

In this example, V-modified $Al_2O_3$ support and supported nickel catalyst with nickel content of 1.0% by weight were prepared.

1.61 g of ammonium vanadium oxide ($NH_4VO_3$) was dissolved in 27.0 ml of 10% ammonia to give an aqueous solution. 10.0 g of $\gamma$-$Al_2O_3$ was impregnated with 9.0 ml of the prepared solution, and dried at 100° C. This procedure was repeated twice until 27.0 ml of solution of $NH_4VO_3$ was used up. Subsequently, the water was evaporated and the mixture was dried at 120° C. using an electric heater and then calcining was carried out by heating to 800° C. in an electric furnace for 5 hours to give a vanadium-modified $Al_2O_3$ support. This support is referred to as V-modified-$Al_2O_3$.

V-modified-$Al_2O_3$ supported nickel catalyst having the same nickel content as in Example 1 was prepared by the same method described in Example 1. The catalyst product is referred to as 1% Ni/V-modified-$Al_2O_3$.

Example 9

In this example, a P-modified $Al_2O_3$ support and supported nickel catalyst with nickel content of 1.0% by weight were prepared.

The P-modified $Al_2O_3$ support was obtained as follows: An alumina slurry with a solid content of 23% by weight was prepared by adding 10 g (dry base) of pseudo-boehmite to 33.5 ml water. The alumina slurry was peptised with dilute $HNO_3$. A phosphoric acid solution containing 0.5 g phosphorus was added to the peptised alumina, and the slurry was stirred for 10 minutes. The slurry was subsequently dried at 120° C. The product was calcined for 5 hours at 600° C., and then the calcined product was ground into 100 mesh particles. This support is referred to as P-modified-$Al_2O_3$.

P-modified-$Al_2O_3$ supported nickel catalyst having the same nickel content as Example 1 was prepared by the same method described in Example 1. The catalyst product is referred to as 1% Ni/P-modified-Al2O$_3$.

Example 10

In this example, a Ca-modified $Al_2O_3$ support from pseudo-boehmite, and a supported nickel catalyst with nickel content of 1.0% were prepared.

4.12 g of calcium nitrate ($Ca(NO_3)_2.4H_2O$) was dissolved in 33.5 ml of distilled water to give aqueous solution. 10 g (dry base) of pseudo-boehmite was added to this aqueous solution to give an alumina slurry with a solid content of 23% by weight. The alumina slurry was peptised with dilute $HNO_3$. The peptised alumina was subsequently dried at 120° C. The product was then calcined for 10 hours at 650° C., and the calcined product was ground into 100 mesh particles. This support is referred to as $Ca-Al_2O_3$.

$Ca-Al_2O_3$ supported nickel catalyst having the same nickel content as Example 1 was prepared by the same method described in Example 1. The catalyst product is referred to as 1% $Ni/Ca-Al_2O_3$.

Example 11

In this example, a Ca-modified-$Al_2O_3$ supported nickel catalysts as prepared in Example 1 was further treated with a promoting agent comprising boron, using a chemical reduction method.

10 g of the catalyst prepared in Example 1 was dispersed in 40 ml of distilled water, and a 0.5 M $KBH_4$ solution was added dropwise to reduce Ni. The initial molar ratio of B to metal was 5:2. After the reduction ceased, the product was washed first with distilled water several times, then with iso-propanol. The catalyst product is referred to as 1% NiB/Ca-modified-$Al_2O_3$.

Examples 12 to 13

In these examples, Ca-modified-$Al_2O_3$ supported nickel catalysts with a promoting agent comprising boron and a dispersing agent comprising either La or Ce were prepared.

10 g of Ca-modified-$Al_2O_3$ support as prepared in Example 1 was added into an aqueous solution containing 0.495 g of nickel nitrate ($Ni(NO_3)_2.6H_2O$), 0.008 g of $La(NO_3)_3.9H_2O$ (or $Ce(NO)_3.9H_2O$) and 8.5 ml of distilled water. The product was subsequently dried at 100° C., and calcined for 5 hours at 310° C. The dry product was further modified by B by the same method described in Example 11. The catalyst products are referred to as 1% NiLaB/Ca-modified-$Al_2O_3$ and 1% NiCeB/Ca-modified-$Al_2O_3$, respectively.

Comparative Example 1

In this comparative example, a catalyst having the same nickel content as the catalyst described in Examples 1-10 was prepared by an incipient wetness impregnation method, using non-modified $\gamma$-$Al_2O_3$ as support.

10 g of $\gamma$-$Al_2O_3$ was added into an aqueous solution containing 0.495 g of nickel nitrate ($Ni(NO_3)_2.6H_2O$) and 8.8 ml of distilled water. The product was subsequently dried at 100° C., and calcined for 5 hours at 450° C. to form a 1% $Ni/\gamma$-$Al_2O_3$.

Comparative Example 2

In this comparative example, a catalyst with a nickel content of 2.9% by weight, using a Ca-modified-$Al_2O_3$ support as found in Example 1, was prepared by an incipient wetness impregnation method. This catalyst has the same components as reported by Lu et al., which was discussed earlier.

10 g of Ca-modified-$Al_2O$ was added into an aqueous solution containing 1.47 g of nickel nitrate ($Ni(NO_3)_2.6H_2O$) and 8.8 ml of distilled water. The product was subsequently dried at 100° C., and calcined for 5 hours at 450° C. to form a catalyst having nickel content of 2.9% by weight.

Examples 14 to 16

In these examples, three catalysts with nickel contents of 1.0% were prepared through the same method described in Example 1 by using nickel nitrate as a nickel precursor and a Ca-modified-$Al_2O_3$ support prepared as in Example 1. Each catalyst was calcined for 5 hours at 400° C., 500° C., and 600° C., respectively

Examples 17 to 19

In these examples, three catalysts with nickel contents of 0.8%, 0.5% and 0.3% by weight, respectively, were prepared through the same method described in Example 1 by using nickel nitrate as a nickel precursor and a Ca-modified-$Al_2O_3$ support prepared as in Example 1.

Example 20

The activity/selectivity behaviors of all the supported nickel catalysts prepared in Examples 1–13 as well as the catalysts in Comparative Examples 1 and 2 for partial oxidation of methane to synthesis gas were evaluated. ¼ inch fixed-bed quartz tube reactors with stainless steel jackets, as described in the description, were charged with each catalyst. After reduction with hydrogen at 500° C. for 2 hours, a gaseous reactant mixture having a hourly space velocity of 180,000/h and a molar ratio of methane to oxygen of 2:1 was reacted over the catalyst at 700° C. (furnace temperature) under atmospheric pressure. The gaseous compositions of the reactants and of the products were analyzed by on-line gas chromatography with a thermal conductivity detector unit. The conversion of methane and the selectivity of carbon monoxide and hydrogen measured under the above-mentioned reaction conditions are summarized in Table 1. Selectivity is measured based on the outlet gas composition. The CO selectivity measures the relationship between the concentration of CO and the sum of the concentrations of all the carbon-containing compounds. $H_2$ selectivity measures the relationship between the concentration of $H_2$ and the sum of the concentrations of all the hydrogen-containing compounds.

TABLE 1

Reaction results according to each catalyst

| Ex. | Catalyst | $CH_4$ conversion (%) | Selectivity (%) CO | Selectivity (%) $H_2$ |
|---|---|---|---|---|
| Ex. 1 | 1% Ni/Ca-modified-$Al_2O_3$ | 86.8 | 87.4 | 98.3 |
| Ex. 2 | 1% Ni/Mg-modified-$Al_2O_3$ | 84.5 | 86.6 | 94.3 |
| Ex. 3 | 1% Ni/Ba-modified-$Al_2O_3$ | 80.4 | 84.8 | 93.5 |

TABLE 1-continued

Reaction results according to each catalyst

| Ex. | Catalyst | CH4 conversion (%) | Selectivity (%) CO | Selectivity (%) H2 |
|---|---|---|---|---|
| Ex. 4 | 1% Ni/Zn-modified-Al2O3 | 85.5 | 87.5 | 96.4 |
| Ex. 5 | 1% Ni/Zr-modified-Al2O3 | 86.2 | 88.0 | 97.1 |
| Ex. 6 | 1% Ni/Cu-modified-Al2O3 | 79.1 | 84.0 | 90.9 |
| Ex. 7 | 1% Ni/Co-modified-Al2O3 | 86.3 | 86.5 | 97.1 |
| Ex. 8 | 1% Ni/V-modified-Al2O3 | 85.8 | 87.0 | 97.3 |
| Ex. 9 | 1% Ni/P-modified-Al2O3 | 83.2 | 88.6 | 93.1 |
| Ex. 10 | 1% Ni/Ca-modified-Al2O3 (pseudoboehmite) | 87.3 | 90.2 | 97.1 |
| Ex. 11 | 1% NiB/Ca-modified-Al2O3 | 85.6 | 89.6 | 96.8 |
| Ex. 12 | 1% NiLaB/Ca-modified-Al2O3 | 84.6 | 88.9 | 96.5 |
| Ex. 13 | 1% NiCeB/Ca-modified-Al2O3 | 85.7 | 89.2 | 97.1 |
| Com.Ex.1 | 1% Ni/γ-Al2O3[a] | <5 | N/C[c] | N/C |
| Com.Ex.1 | 1% Ni/γ-Al2O3[b] | <5 | N/C | N/C |
| Com.Ex.2 | 2.9% Ni/Ca-modified-Al2O3 | 87.3 | 88.3 | 97.8 |
| Thermodynamic Data at 750° C. | — | 85.0 | 87.0 | 97.5 |

Reaction conditions: Furnace Temperature = 700° C.; GHSV = 180,000 h$^{-1}$; Pressure = 1 bar)
[a]Reduced for 2 hours at 500° C. with hydrogen.
[b]Reduced for 2 hours at 700° C. with hydrogen.
[c]Not calculated.

As can be seen in Table 1, the catalyst prepared in Comparative Example 1 has no activity for partial oxidation of methane. However, modified-Al$_2$O$_3$-supported nickel catalysts offer excellent activity/selectivity for partial oxidation of methane. For instance, the activity/selectivity for Ca-modified-Al$_2$O$_3$ supported nickel catalysts prepared in Example 1–13 is similar to that for the catalyst with nickel content of 2.9% prepared in Comparative Example 2.

Example 21

In this Example, 1.0% Ni/γAl$_2$O$_3$ prepared in Comparative Example 1 was reduced with hydrogen at 700° C. for 3 hours and its activity/selectivity behaviors were measured in the same manner as in Example 20. The results are incorporated into Table 1. As can be seen in Table 1, no activity for partial oxidation of methane can be detected.

Example 22

The activity/selectivity behaviors of the supported nickel catalysts prepared in Examples 14 to 16 were evaluated for partial oxidation of methane to form synthesis gas in the same manner as in Example 20. Prior to the reactivity evaluation, the samples calcined at 400° C. and 450° C. were pre-reduced at 500° C. for 3 h, and the samples calcined at 500° C. and 600° C. were pre-reduced for 3 h at 600° C. and 650° C. respectively. The methane conversion and the selectivity for CO and H$_2$ are displayed as a function of the catalyst calcination temperatures in FIG. 1. It can be observed that in the calcination temperature range from 400° C. to 450° C., the activity/selectivity behaviors are very similar. However, with increasing calcination temperatures from 450° C. to 600° C., synthesis gas selectivity decreases linearly while CH$_4$ conversion decreases sharply at first, followed by a stable slower decrease.

Example 23

Figure 2:
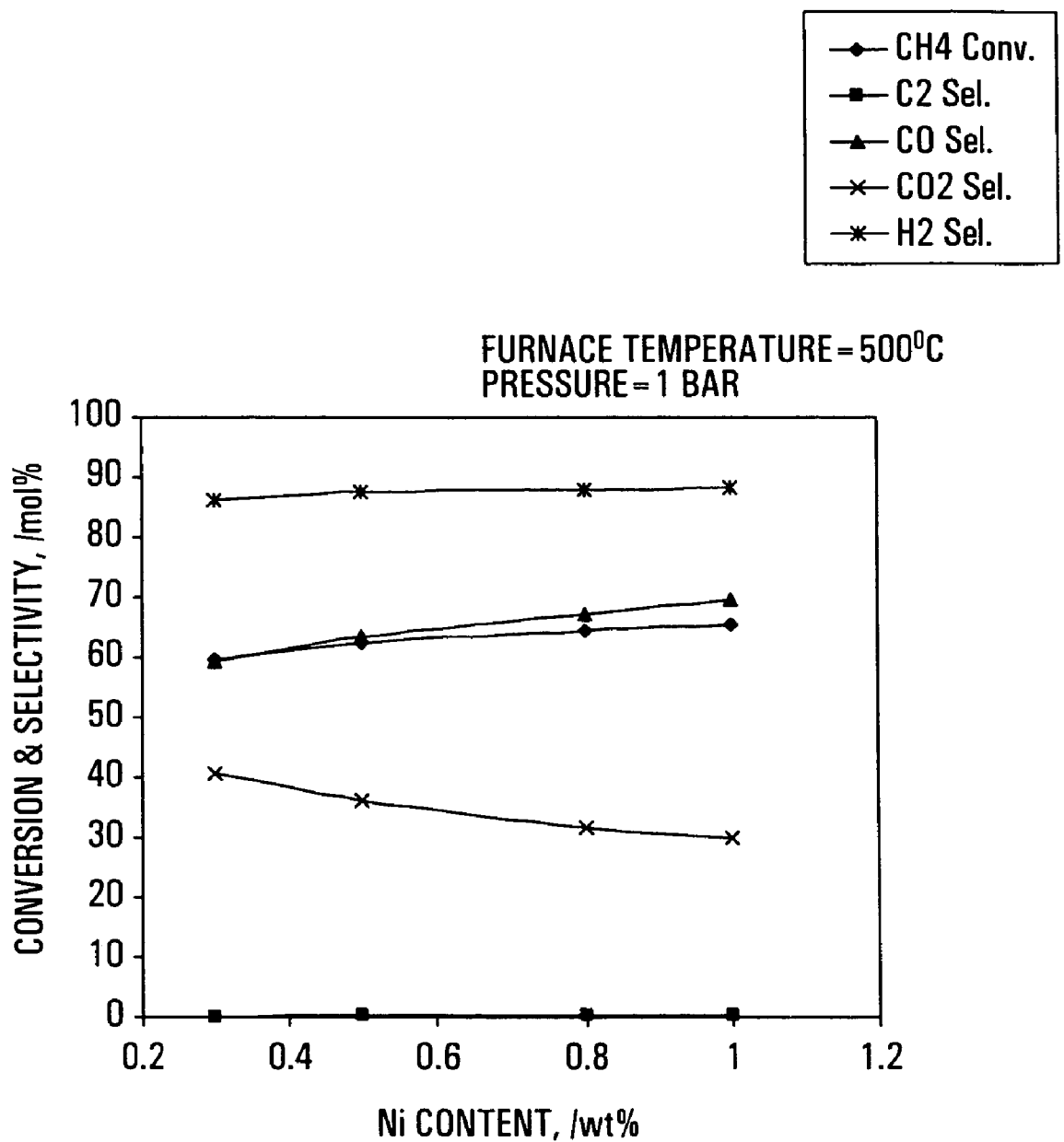
FIG. 2 graphs the activity/selectivity behaviour of the catalyst for the catalytic partial oxidation of methane in relation to the nickel content in the catalyst.

The activity/selectivity behaviours of the supported nickel catalysts prepared in Examples 17 to 19 for partial oxidation of methane to form synthesis gas were evaluated at 500° C. in the same manner as in Example 20. The changes in methane conversion, and in selectivity for CO and H$_2$ with the nickel contents are displayed in FIG. 2. It can be observed that activity/selectivity behaviours for Ca-modified-Al$_2$O$_3$ supported nickel catalysts depend on Ni-loading. Lowering the Ni-loading from 1.0 wt % to 0.3 wt % decreases CH$_4$ conversion and synthesis gas selectivity by only 5%.

Example 24

Figure 3:
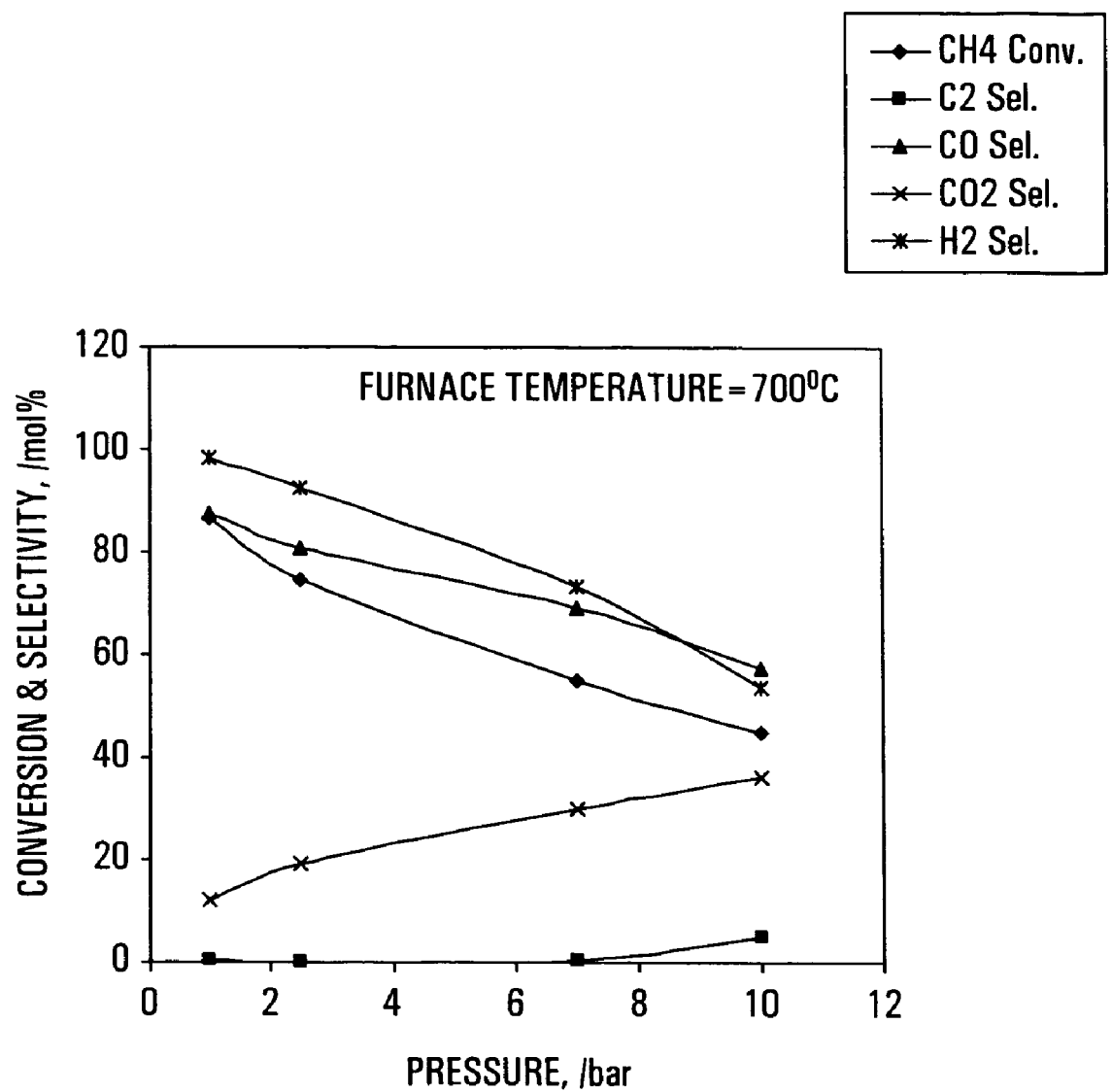
FIG. 3 graphs the activity/selectivity behaviour of the catalyst for the catalytic partial oxidation of methane in relation to the pressure.

The activity/selectivity behaviours of the Ca-modified-Al$_2$O$_3$ supported nickel catalysts prepared in Example 1 for partial oxidation of methane to form synthesis gas were evaluated at elevated pressures in the same manner as in Example 20. FIG. 3 displays the relationship between the pressure at which the reaction is carried out and the changes in methane conversion and the selectivity for CO and H$_2$. Increasing the reaction pressure reduces CH$_4$ conversion and the selectivity of CO and H$_2$ but it promotes the selectivity of CO$_2$. This trend is in agreement with the thermodynamic prediction made from the expected reactions:

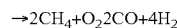

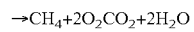

C2 hydrocarbons were obviously formed at 10 bars with a selectivity of approximately 5% at 700° C.

Example 25

As coking is a main reason for the decrease of catalyst reactivity, the carbon deposition and methane conversion for the catalysts with different Ni loading and reaction time were measured under the conditions of 500° C., 5 bars, 180,000/h hourly space velocity and 2:1 methane to oxygen molar ratio. Carbon content on the reacted catalyst was measured using thermal gravimetric analysis (TGA). The results are summarized in Table 2.

TABLE 2

Changes in methane conversion and carbon content according to the catalyst and reaction time

| Ex. | Catalyst | Reaction time (h) | CH4 conversion (%) | Carbon content (wt %) |
|---|---|---|---|---|
| Ex. 1 | 1% Ni/Ca-decorated-Al2O3 | 0.5 | 51.3 | 0.5 |
| | | 2 | 52.0 | 1.7 |
| | | 4 | 52.4 | 3.7 |
| | | 25 | 50.6 | 4.3 |
| Com.Ex.2* | 2.9% Ni/Ca-decorated-Al2O3 | 0.1 | 52.7 | Not detected |
| | | 1.0 | Not detected | 10.8 |

Reaction conditions: Furnace Temperature = 500° C.; GHSV = 180,000 h$^{-1}$; Pressure = 5 bar)
*Reaction was terminated in 1 hour due to plugging of the reactor tube.

As can be observed in Table 2, for 1.0% Ni/Ca-modified-$Al_2O_3$ catalyst prepared in Example 1, the deposited carbon during the reaction is quite low while the conversion of methane is maintained. For Ca-modified-$Al_2O_3$ supported nickel catalyst with nickel content of 2.9 wt % prepared in Comparative Example 2, however, reaction had to be terminated in 1 hour due to the plugging of the reactor tube, and the carbon content after the one hour reaction is 10.8% by weight, indicating severe coking.

Example 26

In this example, the carbon content and methane conversion according to the catalyst and the reaction time were measured at 600° C., 7 bars, and hourly space velocity of 504,000/h by the molar ratio of methane to oxygen of 2:1. Carbon content on the catalyst is measured using TGA. The results are summarized in Table 3.

TABLE 3

Changes in methane conversion and carbon content according to the catalyst and reaction time

| Ex. | Catalyst | Reaction time (h) | $CH_4$ conversion (%) | Carbon content (%) |
|---|---|---|---|---|
| Ex. 1 | 1% Ni/Ca-modified-$Al_2O_3$ | 43 | 66 | 2.0 |
| Ex. 11 | 1% NiB/Ca-modified-$Al_2O_3$ | 43 | 67 | 0 |
| Ex. 12 | 1% NiLaB/Ca-modified-$Al_2O_3$ | 43 | 67.1 | 0 |
| Ex. 13 | 1% NiCeB/Ca-modified-$Al_2O_3$ | 43 | 66.9 | 0.2 |

Reaction conditions: Furnace Temperature = 600° C.; GHSV = 504,000 $h^{-1}$; Pressure = 7 bar)

It can be observed that the B and/or La modified catalysts show better resistance to the production of carbon by-products, i.e. more resistant to coking.

Example 27

In this example, the $CH_4$ conversion, the CO selectivity and the $H_2$ selectivity was determined at different temperatures for catalyst having varying promoting agents and dispersing agents, as shown in Table 4.

TABLE 4

Effect of Promoting agents and Dispersing Agents

| | 600° C. | | | 700° C. | | | 750° C. | | |
|---|---|---|---|---|---|---|---|---|---|
| | $CH_4$ conv | $S_{CO}$ | $S_{H2}$ | $CH_4$ conv | $S_{CO}$ | $S_{H2}$ | $CH_4$ conv | $S_{CO}$ | $S_{H2}$ |
| 1% NiLa[a] | 67.2 | 72.4 | 89.4 | 77.2 | 83.3 | 93.6 | n/a | n/a | n/a |
| 1% NiLa[b] | 71.8 | 77.5 | 91.6 | 83.2 | 87.7 | 96.2 | 88.7 | 91.3 | 98.0 |
| 1% NiLaB[c] | 73.6 | 79.7 | 92.2 | 84.6 | 88.9 | 96.5 | 89.0 | 91.6 | 98.1 |
| 1% NiCe[d] | 73.0 | 78.9 | 92.1 | 83.8 | 88.2 | 96.2 | 88.7 | 91.5 | 97.9 |
| 1% NiCe[e] | 73.1 | 78.9 | 92.2 | 82.7 | 87.3 | 95.9 | 87.2 | 90.3 | 97.5 |
| 1% NiCeB[f] | 75.3 | 81.2 | 93.0 | 85.7 | 89.2 | 97.1 | 89.9 | 91.8 | 98.4 |

[a]mol ratio of Ni/La = 50;
[b]mol ratio of Ni/La = 100, calcined at 450° C.;
[c]mol ratio of Ni/La = 100, calcined at 310° C.,
[d]mol ratio of Ni/Ce = 100, calcined at 450° C.,
[e]mol ratio of Ni/Ce = 100, calcined at 310° C.,
[f]mol ratio of Ni/Ce = 100, calcined at 310° C.

Example 28

In this example, a catalyst according to the present invention (1% NiB/$CaAl_2O_4$—$Al_2O_3$) is used to produce synthesis gas through a $CO_2$ reforming process of $CH_4$. Table 5 gives the $CH_4$ conversion results and the $CO_2$ conversion results for the above process at different temperatures.

TABLE 5

The effect of furnace temperature on $CH_4$, $CO_2$ conversion (1 bar, 20% $CH_4$/20% $CO_2$/Ar, GHSV = $6 \times 10^4$ $mlh^{-1}g^{-1}$)

| Furnace temperature (° C.) | $CH_4$ conversion (%) | $CO_2$ conversion (%) |
|---|---|---|
| 600 | 43.3 | 52.7 |
| 700 | 74.9 | 79.1 |
| 750 | 84.1 | 85.1 |

Figure 6:
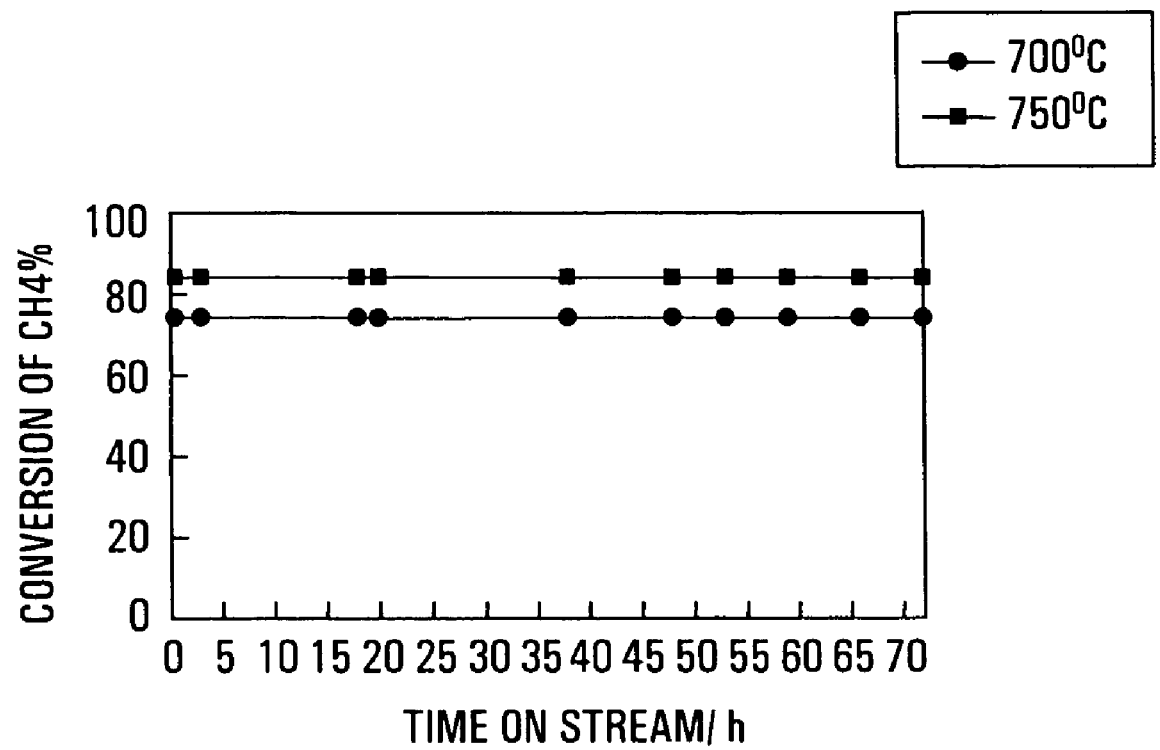
FIG. 6 graphs the conversion of methane over time in a $CO_2$ reforming process with a 1% $NiB/CaAl_2O_4$—$Al_2O_3$ catalyst.

A graphical representation of the $CH_4$ conversion is given in accompanying FIG. 6, which displays that the efficacy of the catalyst in a $CO_2$ reforming process does not diminish over time.

Example 29

Figure 7:
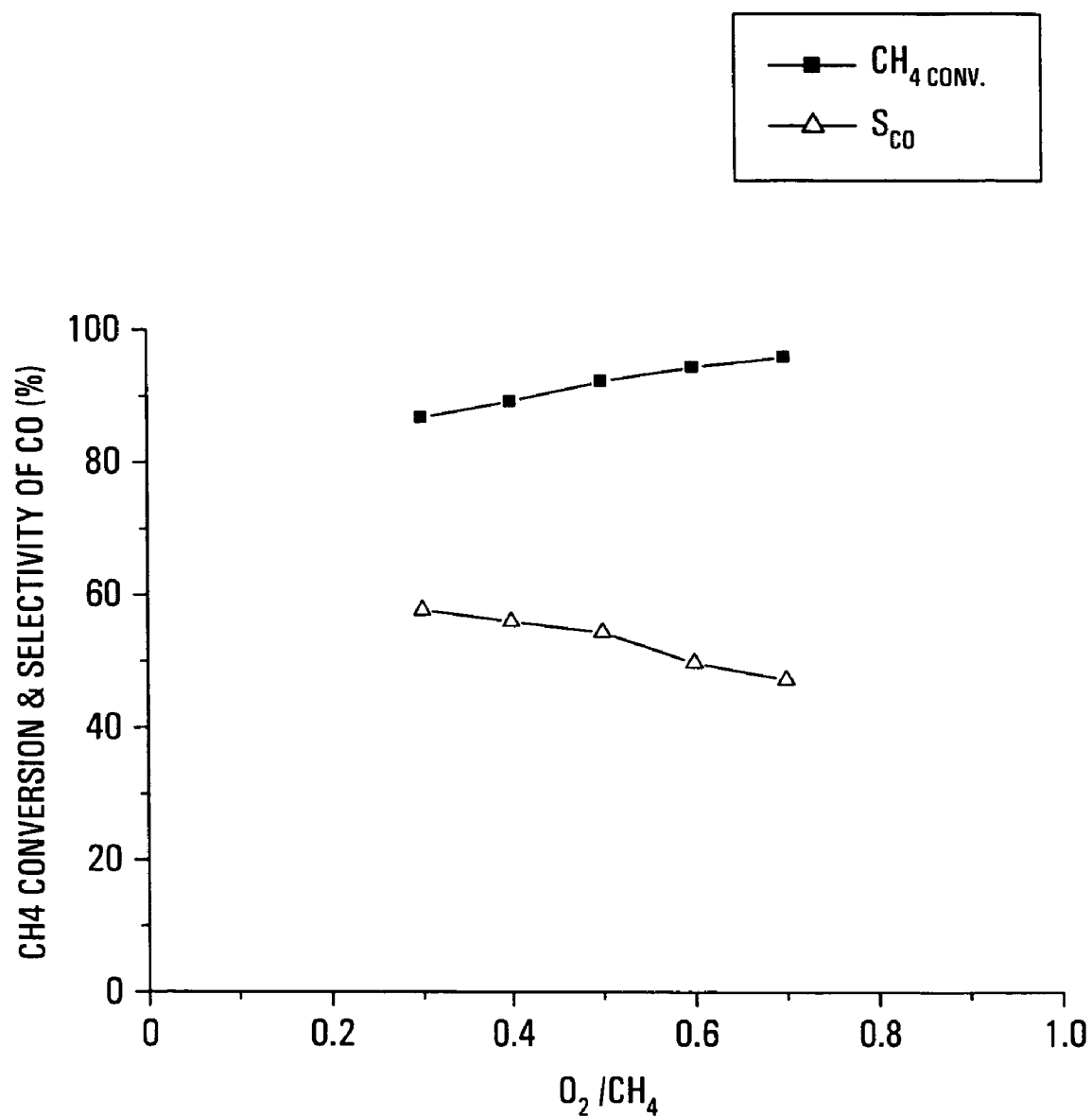
FIG. 7 graphs the $CH_4$ conversion and the CO selectivity in a coupled steam reforming and catalytic partial oxidation process using 1 wt % $Ni/CaAl_2O_4$—$Al_2O_3$ as a catalyst. The $CH_4$ conversion and the CO selectivity are graphed as a function of the $CH_4/O_2$ ratio at 850° C., under 15 atm of pressure, at a $CH_4$ flow of 20 ml/min and at a $CH_4/H_2/N_2$ ratio of 1/2/1.887.

In this example, a catalyst according to the present invention (1 wt % Ni/$CaAl_2O_4$—$Al_2O_3$) is used to produce synthesis gas through a coupled catalytic partial oxidation (CPO) and steam reforming process. FIG. 7 shows that the catalyst has good $CH_4$ conversion, and that an increase in the ratio between $O_2$ and $CH_4$ leads to an increase in the $CH_4$ conversion and a decrease in the selectivity of CO.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

It must be noted that as used in this specification and the appended claims, the singular forms "a", "an", and "the"

include plural reference unless the context clearly dictates otherwise. Unless defined otherwise all technical and scientific terms used herein have the same meaning as commonly understood to one of ordinary skill in the art to which this invention belongs.

The invention claimed is:

1. A catalyst for the production of synthesis gas, the catalyst comprising a modified support, from about 0.1 to about 1.3% by weight of nickel, and a promoting agent comprising boron, wherein the nickel and the boron form an alloy.

2. The catalyst according to claim 1, wherein the modified support comprises a metal oxide and a modifying element.

3. The catalyst according to claim 2, wherein the metal oxide is selected from the group consisting of aluminum oxide, zirconium oxide, titanium oxide, magnesium oxide and silicon oxide.

4. The catalyst according to claim 3, wherein the aluminum oxide is selected from the group consisting of $\gamma$-$Al_2O_3$, $Al(OH)_3$, $AlO(OH)$ and $(AlO(OH).xH_2O)$.

5. The catalyst according to claim 2, wherein the modifying element is selected from the group consisting of elements of periodic table groups 1 to 12, 14, 15 and the rare earth elements.

6. The catalyst according to claim 5, wherein the modifying element is selected from the group consisting of magnesium, calcium, barium, titanium, zirconium, vanadium, cobalt, copper, zinc, silicon and phosphorus.

7. The catalyst according to claim 1, wherein the promoting agent is present in an amount of about 0.5% or less by weight of catalyst.

8. The catalyst according to claim 1, which further comprises a dispersing agent.

9. The catalyst according to claim 8, wherein the dispersing agent comprises a rare earth element selected from the group consisting of La, Sm and Ce.

10. The catalyst according to claim 9, wherein the rare earth element is present in an amount of about 0.03% or less by weight of catalyst.

11. A process for preparing a catalyst according to claim 1 which process comprises
  a) calcining a mixture comprising a modified support and an amount of a nickel containing salt, the amount of the nickel containing salt being such that the nickel is present in the catalyst in an amount of from about 0.1 to about 1.3% by weight after calcination, and
  b) contacting the calcined mixture with a promoting agent comprising boron to form an alloy of nickel and boron.

12. The process according to claim 11, wherein the calcination is carried out at a temperature of from about 300° C. to about 650° C.

13. The process according to claim 11, wherein a dispersing agent is added to the mixture prior to the calcination.

14. The process according to claim 13, wherein the dispersing agent comprises a rare earth element selected from the group consisting of La, Sm and Ce.

15. The process according to claim 14, wherein the dispersing agent is in the form of a nitrate, a chloride or an acetate salt.

16. The process according to claim 15, wherein the dispersing agent is selected from $La(NO_3)_3.9H_2O$ and $Ce(NO_3)_3.9H_2O$.

17. The process according to claim 14, wherein the dispersing agent is added in an amount suitable to give a catalyst having about 0.03% or less by weight of a rare earth element after calcination.

18. The process according to claim 11, wherein the promoting agent is in the form of a solution.

19. The process according to claim 11, wherein the promoting agent is a borohydride salt.

20. The process according to claim 11, wherein the promoting agent is added in an amount suitable to give a catalyst having about 0.5% or less by weight of boron.

21. A process for the catalytic partial oxidation of a hydrocarbon, the process comprising contacting a catalyst according to claim 1 with a gaseous mixture of oxygen and of a C1–C7 hydrocarbon, at a temperature of from about 500° C. to about 1200° C.

22. The process according to claim 21, wherein the catalyst further comprises, as a dispersing agent, a rare earth element selected from La, Sm and Ce.

23. The process according to claim 21, wherein the catalyst is contacted with the gaseous mixture at a pressure of from about 1 bar to about 7 bar.

24. The process according to claim 21, wherein the gaseous mixture of oxygen and of a C1–C7 hydrocarbon has a ratio of oxygen to carbon of approximately 1:2.

25. The process according to claim 21, wherein the catalyst is contacted with a reductive atmosphere prior to contacting the gaseous mixture of oxygen and methane.

26. The process according to claim 25, wherein the reductive atmosphere comprises molecular hydrogen.

27. The process according to claim 25, wherein the catalyst is contacted with a reductive atmosphere at a temperature of from about 300° C. To about 1000° C.

28. The process according to claim 21, wherein the catalyst further comprises a dispersing agent selected from the group consisting of La, Sm and Ce, in an amount of about 0.03% or less by weight and comprises boron in an amount of 0.5% or less by weight, and wherein the catalyst is contacted with a gaseous mixture comprising oxygen and methane in a molar ratio of 1:2, at a temperature of about 500° C. and under a pressure of about 7 bars.

* * * * *